United States Patent
Metzger

[19]

[11] Patent Number: 6,131,876
[45] Date of Patent: Oct. 17, 2000

[54] VALVE HAVING A DISPLACEABLE VALVE SPINDLE

[75] Inventor: Harry Metzger, Kervo, Finland

[73] Assignee: Marioff Oy, Vantaa, Finland

[21] Appl. No.: 09/068,401

[22] PCT Filed: Sep. 12, 1997

[86] PCT No.: PCT/FI97/00543

§ 371 Date: May 8, 1998

§ 102(e) Date: May 8, 1998

[87] PCT Pub. No.: WO98/11371

PCT Pub. Date: Mar. 19, 1998

[30]  Foreign Application Priority Data

Sep. 13, 1996 [FI] Finland ..................................... 963643

[51] Int. Cl.[7] ............................................... F16K 31/122
[52] U.S. Cl. ............................................. 251/63.6; 251/73
[58] Field of Search ................................ 251/63.6, 73, 74

[56]  References Cited

U.S. PATENT DOCUMENTS

| 2,692,112 | 10/1954 | Szitar, Jr. . | |
| 3,385,559 | 5/1968 | Churchill | 251/74 |
| 4,398,553 | 8/1983 | Perrine | 251/74 |
| 4,519,580 | 5/1985 | Leighton et al. . | |
| 4,976,460 | 12/1990 | Newcombe et al. . | |
| 5,478,049 | 12/1995 | Lescoe . | |

FOREIGN PATENT DOCUMENTS 1 403 460   8/1975   United Kingdom .

*Primary Examiner*—Kevin Shaver
*Assistant Examiner*—Eric Keasel
*Attorney, Agent, or Firm*—Watson Cole Grindle Watson, P.L.L.C.

[57]  ABSTRACT

The invention relates to a valve comprising a valve housing 1 with a duct 2 that can be optionally opened or closed, a valve body 4 and a valve spindle 3 that is displaceable in relation to the valve body 4 from a first position where the valve spindle 3 closes the duct 2, to a second position where the valve spindle 3 keeps the duct 2 open. The valve comprises a displaceable flange part 15 that surrounds the valve body 4, and which flange part 15 is arranged to support the valve body 4 by means of at least one displacement element 11, 12, 13. Flange part 15 is arranged to be displaced, in relation to the valve body 4, when force is applied to the flange part 15. To make the valve easy to operate, utilize very little force and have small dimensions, the valve spindle 3 is arranged to be displaced from the first position to the second position. The displacement of the valve spindle 3 is due to a pressure acting in the duct 2 and the valve body 4 which has a passage 20 that leads from an inlet 21 to a pressure chamber 22. The pressure chamber 22 is defined by the valve body 4 and the flange part 15 and the pressurized pressure chamber 22 is used to apply force against the flange part 15.

10 Claims, 2 Drawing Sheets

VALVE HAVING A DISPLACEABLE VALVE SPINDLE

BACKGROUND OF THE INVENTION

The present invention relates to a valve comprising a valve housing with a duct that can be optionally opened or closed, a valve body, and a valve spindle that is displaceable from a first position where the valve spindle closes the duct to a second position where the valve spindle opens the duct. More precisely the invention relates to a valve according to the preamble of appended claim 1.

DESCRIPTION OF THE RELATED ART

The problem associated with known valves is that the forces that are needed to keep them closed are great and that the valves are normally kept closed by the relative pressure in different areas in the valve. Hereby known valves function so that a greater area is used for opening the valve with a lower pressure. It requires great forces to shift these valves into different working positions. These valves often have problems with leakage and their construction is complicated.

Valves closing with levers are also known, but due to the great forces involved they have a tendency to break down when adjusted and can therefore generally be adjusted only once.

GB Patent 1403460 discloses a valve with balls for locking the valve spindle alternately in an open or closed position. The valve is operated from an open to a closed position, and vice versa, by means of a hand operated key. When opening the valve the fluid pressure operating in the valve is not utilized for displacing the valve spindle into an open position. Hereby the valve cannot be easily operated if there is a high fluid pressure in the valve.

BRIEF SUMMARY OF THE INVENTION

The present invention relates to a valve where the solution to said problems has been achieved. For this purpose the features given in appended claim 1 characterize the present invention. Preferred embodiments of the valve are described in appended claims 2–10.

The opening pressure of the valve is determined solely by the force (pressure) required for displacing the flange part and hereby freeing the displacement element/elements from its/their path in the valve, since the construction is such that a pressure (working pressure) operating in the valve duct displaces the valve spindle into a position where the valve is open.

The valve is operated by means of a mechanical locking mechanism that is opened pneumatically or hydraulically. The locking mechanism is closed and opened by means of at least one displacement element that is guided by a path so that when the locking mechanism is opened the displacement element can roll out of the locking mechanism, whereby the valve is opened by the valve spindle being displaced by the pressure operating in the valve duct.

The valve of the invention functions securely, its dimensions are small and the valve parts do not become deformed by the forces needed to operate the valve. The valve can easily be opened with very small forces, solely by displacing the flange part that in the closed position of the valve hinders the displacement element from being displaced outwards so that the valve spindle can be displaced from a closed to an open position. To give an example, the valve only requires an opening pressure of about 2 bar when the working pressure on the valve is 200 bar. The valves on the market normally require 15 bar for opening at a working pressure of 150 bar.

BRIEF DESCRIPTION OF THE DRAWINGS

In the following an embodiment of the invention will be described by means of an attached drawing, in which.

DETAILED DESCRIPTION OF THE INVENTION

Figure 1:
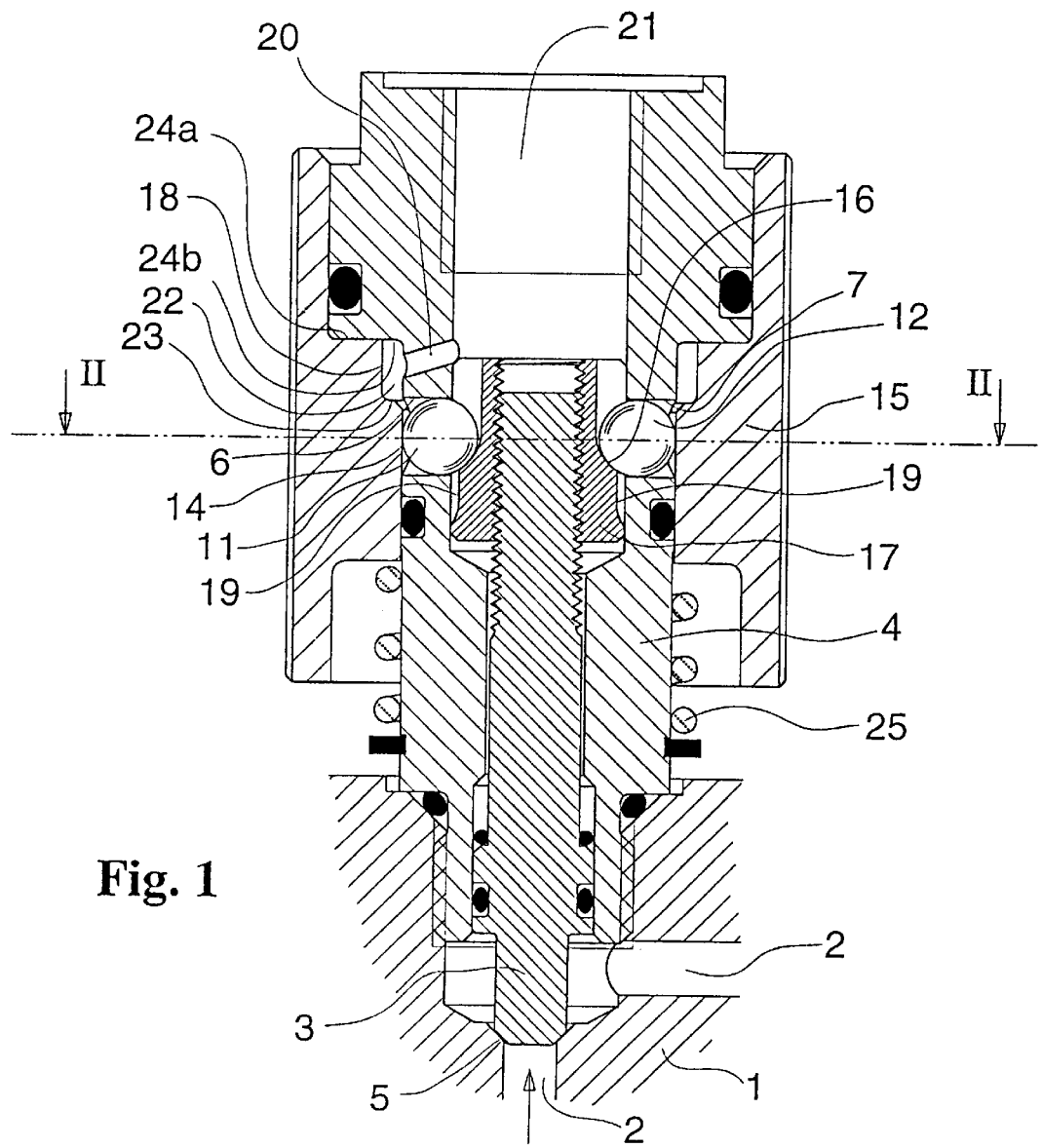
FIG. 1 shows the valve in a closed position.
Figure 2:
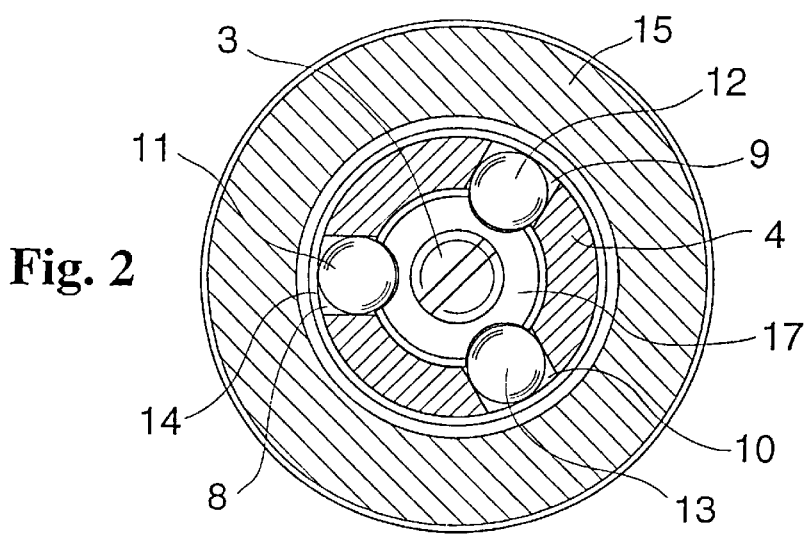
FIG. 2 shows the valve according to FIG. 1 seen along the intersectional line II—II.

The valve in FIG. 1 comprises a valve housing 1 with a duct 2 that can alternately be opened and closed by means of a valve spindle 3. The valve spindle 3 is displaceable in a valve body 4 that is screwed into the valve housing 1. When the valve spindle 3 is in a first position it will close the duct 2 by tightening it against a sealing surface 5 in the valve housing 1.

The valve spindle 3 is kept in the position shown in FIG. 1 by the walls 6, 7 of three openings 8–10 made in the valve body 4 and a first portion in the inner wall 14 of a flange part 15, in conjunction with three balls 11–13, comprising a stop means hindering a downwards broadening first abutting section 16 in a form part 17, arranged around the valve spindle 3, from being displaced in an upward direction. The form part 17 is attached to the valve spindle 3 by means of threads.

In the valve body 4 there is a passage 20 leading from an inlet 21 to a pressure chamber 22. By applying a smaller pressure of e.g. 3 bar to the inlet 21, the flange part can be displaced from the position in FIG. 1 downwards to the position in FIG. 3. This is due to the fact that the said pressure exerts pressure on a pressure area 23 that gives the flange part 15 force downwards so that it can glide in relation to the valve body 4. After the flange part 15 has started to move downwards, a larger area 24A that functions as a pressure area for said lesser pressure is uncovered. Since the area 24A is relatively large, a great deal of force is exerted to displace the flange part 15 downwards to the position shown in FIG. 3.

In the inner wall 14 of the flange part 15 there is a second portion formed as a recess 18 for receiving the balls 11–13, after the flange part has been pressed downwards against the valve housing 1. As the flange part 15 is displaced downwards, so that its area 24a makes contact with a contact area 24b of the valve body 4 and the balls 11–13 roll along the form part 17 to bear against a second abutting section 19 in the form part, see FIG. 3 that shows the valve in an open position.

A spring 25 that has been arranged to exert force against the flange part 15, so that its area 24a makes contact with a contact area 24b of the valve body 4 and stops the flange part from falling down from the position in FIG. 1.

Functional Description

In FIG. 1 the valve is closed by the valve spindle 3 that presses down against the valve housing 1. The valve spindle 3 is kept closed via the ball path of the form part 17 and more specifically its abutting section 16 and the balls 11–13 that press against the valve body 4 and the flange 15.

Thus the valve is kept closed by the flange part 15 being in an upper position like in FIG. 1. The spring 25 secures that the flange part 15 is not by mistake displaced downwards.

Figure 3:
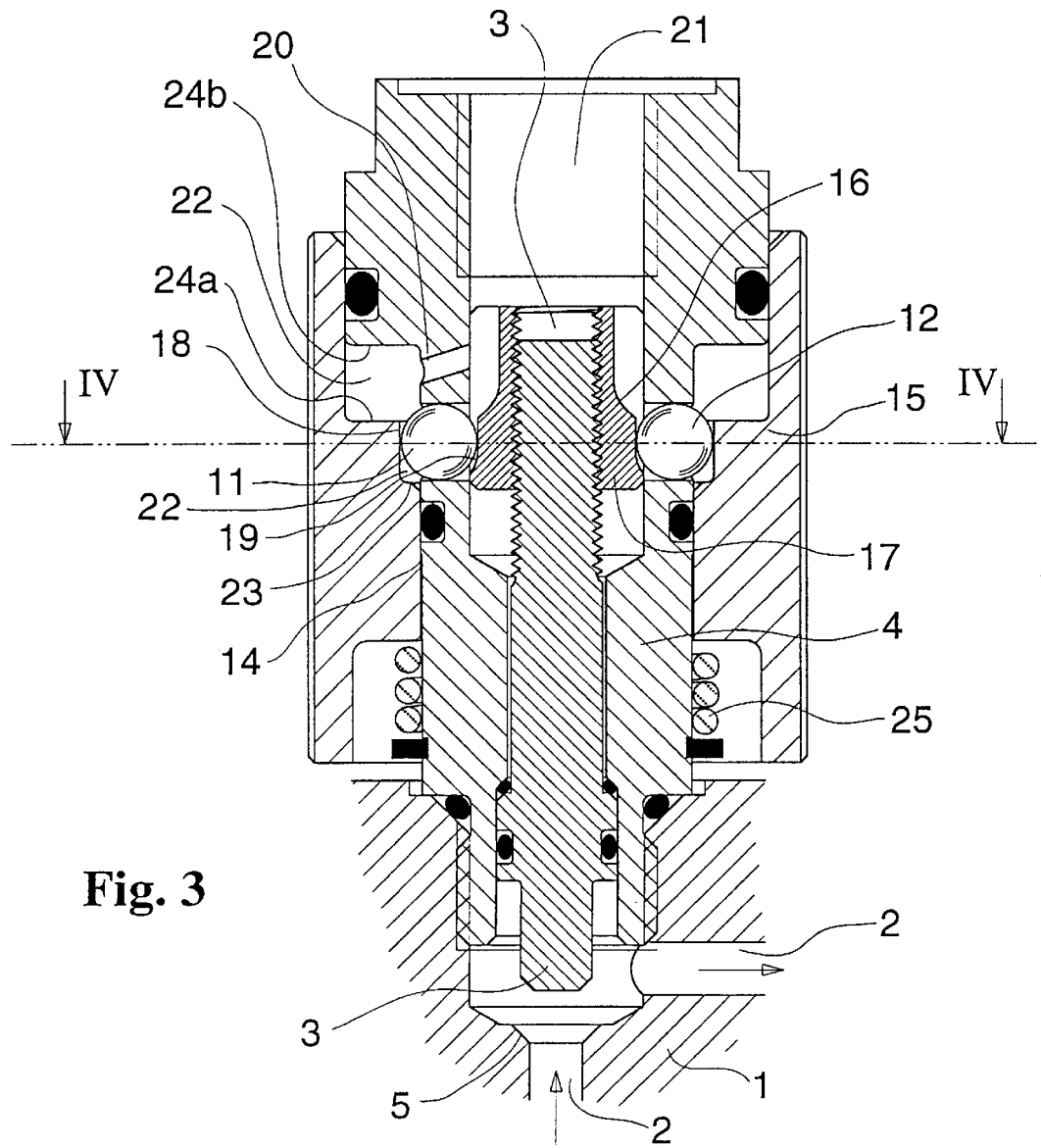
FIG. 3 shows the valve in an open position and FIG. 4 shows the valve according to FIG. 3 seen along the intersectional line IV—IV.
Figure 4:
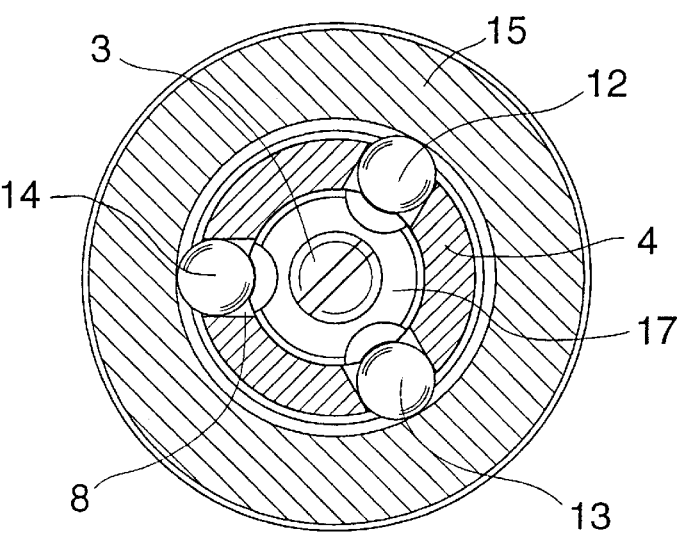

When the valve is desired to be opened, to a position shown in FIG. 3, the pressure to the inlet 21 is increased, whereby the pressure in the chamber 22 and the pressure operating on the area 23 presses down the flange 15, the balls 11–13 are released and the valve spindle 3 rises upwards owing to the pressure in the duct 2, the balls follow the ball path and the valve is open in the duct 2.

The forces in the valve are taken up by the balls 11–13 that press against their path and the valve body 4. The inner wall 14 of the flange part 15 keeps the balls 11–13 from being displaced outwards in a radial direction away from the valve body 4.

The invention has been described above by means of one embodiment only. Therefore it is pointed out that the details of the invention can be modified in many ways within the scope of the appended claims. Thus, e.g. the flange part can be arranged to be displaceable in an opposite direction than that described, i.e. upwards, to open the valve. Hereby the recess 18 in the inner wall of the flange part should be located below the balls in the closed position of the valve and the pressure in the pressure chamber 22 should be arranged to displace the flange part upwards at pressure to the inlet 21. Instead of the movement of the valve spindle upwards being stopped by the second abutting section 19 when the valve is in an open position, the movement of the valve spindle can be stopped by some other kind of locking device, e.g. by the valve spindle comprising a shoulder stopping against a shoulder in the valve body. Instead of balls, other types of displacement elements, such as rolls, can be used.

What is claimed is:

1. A valve comprising a valve housing (1) with a duct (2) that can be optionally opened or closed, a valve body (4) connected to the valve housing (1) and a valve spindle (3) that is displaced in relation to the valve body (4) from a first position, where the valve spindle (3) closes the duct (2) by tightening against a sealing surface (5) in the valve housing (1), to a second position where the valve spindle (3) keeps the duct (2) open by the valve spindle (1) being at a distance from the sealing surface, which valve comprises a flange part (15) that surrounds the valve body (4) and is arranged to be displaceable in relation to it between a first position and a second position to support the valve spindle (1) alternatively in said two positions, whereby at least one displacement element (11–13) is arranged to be displaced from a first locking position where the displacement element (11–13) abuts on the wall (6,7) of opening (8–10) in the valve body (4) and on the inner wall (14) of the flange part (15) at a first position of the inner wall to a second release position, where the displacement element (11–13) is released from said locking position, as the flange part (15) is displaced from the first position to the second position, whereby the displacement element (11–13), when the flange part (15) is in the first position, is arranged to bear against a first abutting section (16) in a form part (17) in the valve spindle (3) to keep the valve spindle (3) from being displaced from the first position to the second position, and when force is applied to the flange part (15), the flange part (15) is arranged to glide in relation to the valve body (4) from the first position to the second position to release the displacement element (11–13) from the first abutting section and bring the displacement element (11–13) to the second position, wherein the valve spindle (3) is arranged to be displaced from the first position to the second position by pressure operating in the duct (2) as the flange part (15) is displaced so that the displacement element (11–13) is displaced from the first position to the second position, and that the valve body (4) comprises a passage (20) leading from an inlet (21) to a pressure chamber (22), which is defined by the valve body (4) and the flange part (15), to pressurize the pressure chamber and hereby apply said force against the flange part (15) and displace it so that its second portion comes to bear against the displacement element (11–13).

2. A valve according to claim 1, wherein the flange part (15) comprises a pressure area (23) that is part of the wall surface in the pressure chamber (22) when the valve spindle (3) is in the first position (closed position), whereby the pressure operating in the pressure chamber (22), which influences the pressure area (23), is arranged to exert said force on the flange part (15) and to displace it so that the valve spindle (3) glides into said second position.

3. A valve according to claim 2, wherein the flange part (15) and the valve body (4) have opposite contact surfaces (24a and 24b, respectively) when the valve spindle (3) is in said first position, which surfaces will be at a distance from each other when the valve spindle (3) is displaced to the second position, which surfaces are connected to the pressure chamber (22) as they on their part define the pressure chamber (22) when the valve spindle (3) is in the second position.

4. A valve according to claim 1, wherein the displacement element (11–13) bears against the inner wall of the opening (8–10) in the valve body (4) and on the wall (14) of the flange part (15), in a second portion (18) of the inner wall, to keep the valve spindle (3) in the second position.

5. A valve according to claim 4, wherein the second portion in the inner wall (14) of the flange part (15) is formed by a recess (18) made in the inner wall of the flange part (15).

6. A valve according to claim 1, wherein the displacement element (11–13) in its release position is arranged to bear against a second abutting section (19) in the form part (17) to retard further movement of the valve spindle (3) away from the first position of the valve spindle (3).

7. A valve according to claim 1, wherein a spring (25) is arranged between the flange part (15) and the valve body (4), which spring (25) is arranged to exert a force on the flange part (15) to displace the flange part (15) into a position where the first portion in its inner wall presses against the displacement element (11–13).

8. A valve according to claim 4, wherein there are two additional displacement elements (12 and 13) that are arranged to be displaced like the displacement element (11), whereupon there are for these additional displacement elements (12 and 13) corresponding first abutting sections (16) in the form part (17), walls (7) in the valve body (4) and second portions (18) in the flange part (15).

9. A valve according to claim 8, wherein the displacement element (11) and the two additional displacement elements (12 and 13) lie on a common plane, which is perpendicular to the valve spindle (3), and that they are arranged at the same distance from each other.

10. A valve according to claim 1, wherein the displacement element (11–13) is a ball.

* * * * *